US011416089B2

(12) United States Patent
Su et al.

(10) Patent No.: US 11,416,089 B2
(45) Date of Patent: Aug. 16, 2022

(54) KNOB DEVICE APPLICABLE TO TOUCH PANEL

(71) Applicant: HIMAX TECHNOLOGIES LIMITED, Tainan (TW)

(72) Inventors: Chun-Jen Su, Tainan (TW); Chun-Kai Chuang, Tainan (TW); Heng-An Hsu, Tainan (TW); Wai-Pan Wu, Tainan (TW); Cheng-Hung Tsai, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 0 days.

(21) Appl. No.: 17/177,169

(22) Filed: Feb. 16, 2021

(65) Prior Publication Data
US 2022/0019297 A1 Jan. 20, 2022

Related U.S. Application Data

(60) Provisional application No. 63/054,198, filed on Jul. 20, 2020.

(51) Int. Cl.
*G06F 3/039* (2013.01)
*G06F 3/041* (2006.01)
*G06F 3/0362* (2013.01)

(52) U.S. Cl.
CPC .......... *G06F 3/0393* (2019.05); *G06F 3/0362* (2013.01); *G06F 3/041* (2013.01)

(58) Field of Classification Search
CPC .... G06F 3/0362; G06F 3/0312; G06F 3/0346; G06F 3/041; G06F 3/0393
See application file for complete search history.

(56) References Cited

U.S. PATENT DOCUMENTS

| 9,417,719 B2 | 8/2016 | Inai |
| 10,635,201 B2 | 4/2020 | Ballan |
| 2008/0110739 A1 | 5/2008 | Peng |

(Continued)

FOREIGN PATENT DOCUMENTS

| CN | 106716580 A | 5/2017 |
| CN | 111183406 A | 5/2020 |

(Continued)

OTHER PUBLICATIONS

Su, the specification, including the claims, and drawings in the U.S. Appl. No. 17/160,303, filed Jan. 27, 2021.

*Primary Examiner* — Hang Lin
(74) *Attorney, Agent, or Firm* — Winston Hsu

(57) ABSTRACT

A knob device is applicable to a touch panel. The knob device includes a knob cover, a plurality of sensing pads and a rotation sensing element. The plurality of sensing pads are fixedly arranged on the touch panel. A gap is form between two sensing pads. The plurality of sensing pads and gaps are distributed in a ring area around a center of an orthographic projection of the knob cover. The rotation sensing element is connected to the knob cover. When the knob cover is turned to be rotated, the rotation sensing element is rotated synchronously. When a user touches the knob device and the rotation sensing element overlaps one of the plurality of sensing pads, the touch panel generates a rotation sensing signal in response to a location of the rotation sensing element.

12 Claims, 5 Drawing Sheets

(56) References Cited

U.S. PATENT DOCUMENTS

| | | |
|---|---|---|
| 2014/0042004 A1* | 2/2014 | Tseng .................... G06F 3/0362 |
| | | 200/336 |
| 2018/0046267 A1 | 2/2018 | Kobayashi |
| 2020/0064951 A1 | 2/2020 | Bauer |
| 2020/0073487 A1 | 3/2020 | Ballan |
| 2020/0073513 A1 | 3/2020 | Ballan |
| 2020/0225765 A1 | 7/2020 | Hori |
| 2020/0233521 A1 | 7/2020 | Sasaki |
| 2021/0048846 A1* | 2/2021 | Hinson ................ G06F 3/0488 |
| 2021/0240307 A1 | 8/2021 | Tanaka |

FOREIGN PATENT DOCUMENTS

| | | |
|---|---|---|
| CN | 107533381 B | 10/2020 |
| EP | 3 617 854 A1 | 3/2020 |
| EP | 3 936 983 A1 | 1/2022 |
| GB | 2 247 938 A | 3/1992 |
| WO | 2020/079729 A1 | 4/2020 |
| WO | 2020/137408 A1 | 7/2020 |
| WO | 2020/246077 A1 | 12/2020 |

* cited by examiner

KNOB DEVICE APPLICABLE TO TOUCH PANEL

CROSS REFERENCE TO RELATED APPLICATIONS

This application claims priority to U.S. Provisional Patent Application No. 63/054,198, filed on Jul. 20, 2020, the disclosure of which is incorporated herein by reference in its entirety.

BACKGROUND OF THE INVENTION

1. Field of the Invention

The present invention relates to a user interface (UI) mechanism design, and more particularly, to a knob device applicable to a touch panel.

2. Description of the Prior Art

Knob devices are often used in general electronic apparatus, such as the knob for volume adjustment on an audio player, the knob for frequency adjustment on a radio and the knob for air conditioning/air volume adjustment on a car console, where many of these electronic apparatuses are equipped with a touch panel. Therefore, how to integrate the knob device and the touch panel to assist user in control has become an issue. In some traditional methods, the glass of the touch panel has holes on which the knobs are mounted. However, digging holes in the glass has disadvantages such as complicated steps, high cost and reduced glass strength. In some other traditional methods, the touch pad is installed in the knob and then directly mounted on the touch panel, and the function of the knob is achieved by touch effect of the touch pad on the touch panel. For example, when a user rotates the knob, a finger and the touch pad form a loop with the touch panel, such that a cell of the touch panel touched by the touch pad sends a touch signal. According to touch signals of different cells of the touch panel, the angle of rotation of the knob can be captured. However, certain problems may occur. For example, the resolution of the touch panel may be insufficient when the knob is small. For another example, when the touch pad of the knob is located between two touch panel cells, it is difficult to determine its position. Therefore, there is a need for a novel method and associated architecture to improve the resolution of rotation of the knob on the touch panel for solving the problems without introducing any side effect or in a way that is less likely to introduce a side effect.

SUMMARY OF THE INVENTION

It is an objective of the present invention to provide a knob device applicable to a touch panel, in order to solve the above-mentioned problems.

According to one embodiment of the present invention, a knob device is applicable to a touch panel. The knob device comprises a knob cover, a plurality of sensing pads and a rotation sensing element. The plurality of sensing pads are fixedly arranged on the touch panel. A gap is form between two sensing pads. The plurality of sensing pads and gaps are distributed in a ring around a center of an orthographic projection of the knob cover. The rotation sensing element is connected to the knob cover. When the knob cover is turned to be rotated, the rotation sensing element is rotated synchronously. When a user touches the knob device and the rotation sensing element overlaps one of the plurality of sensing pads, the touch panel generates a sensing signal in response to a location of the rotation sensing element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
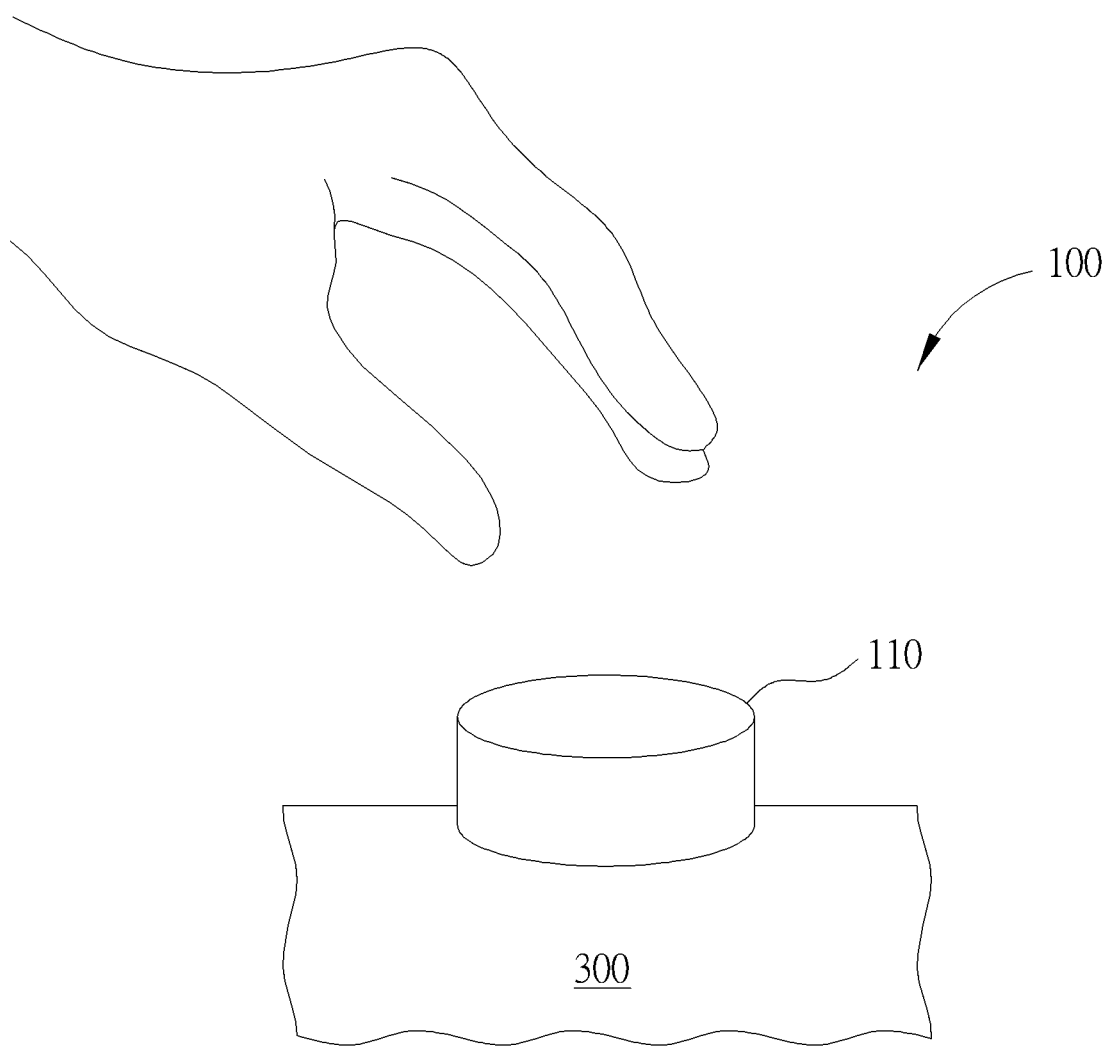
FIG. 1 is a diagram of a knob device arranged on a touch panel according to an embodiment of the present invention.
Figure 2:
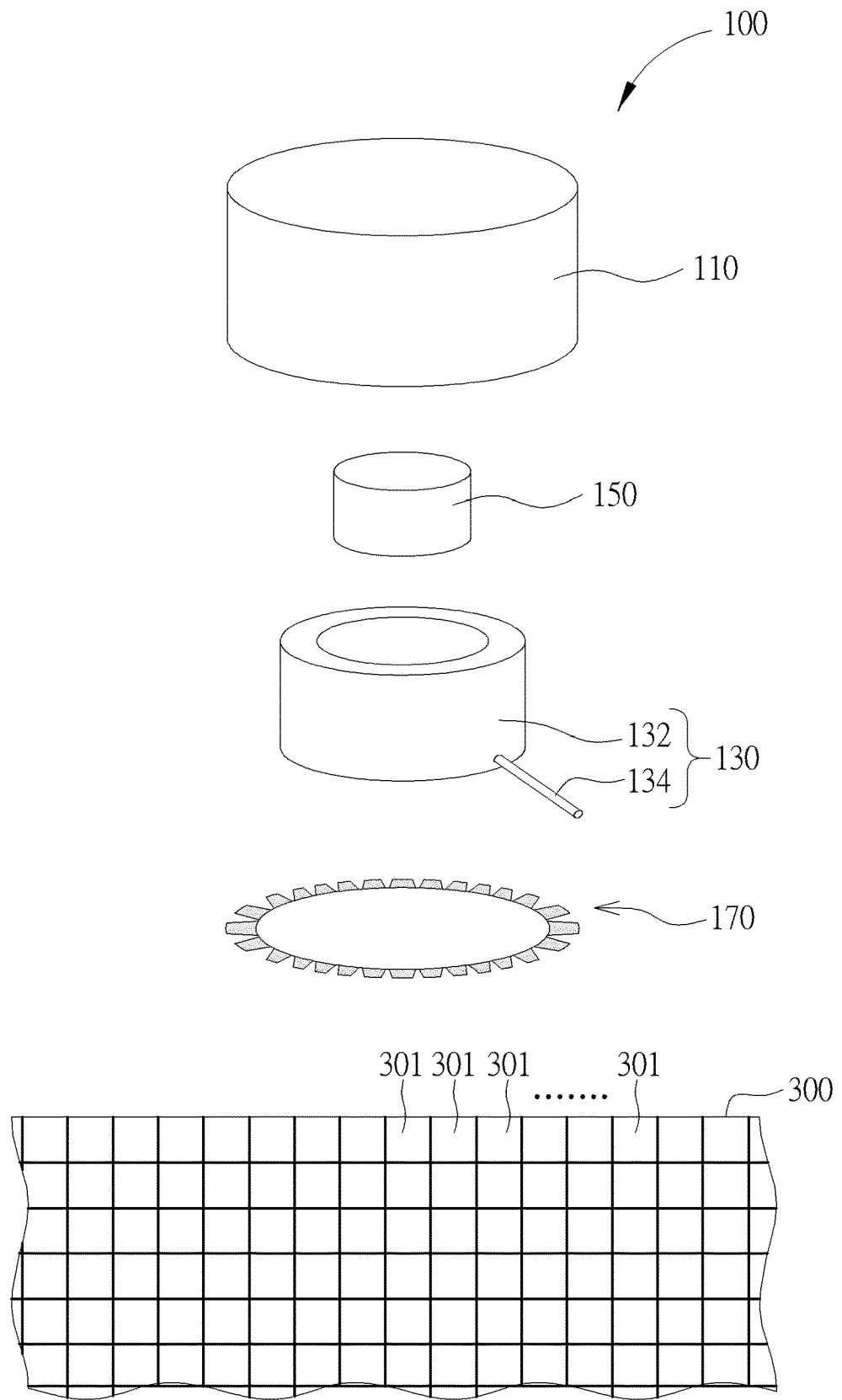
FIG. 2 is an exploded view illustrating the knob device arranged on the touch panel according to an embodiment of the present invention.

Please refer to FIG. 1 in conjunction with FIG. 2. FIG. 1 is a diagram of a knob device 100 arranged on a touch panel 300 according to an embodiment of the present invention. FIG. 2 is an exploded view illustrating the knob device 100 arranged on the touch panel 300 according to an embodiment of the present invention. As shown in FIG. 1, the knob device 100 comprises a knob cover 110 arranged on the touch panel 300. When a user operates the knob device 100 by contacting the knob cover 110, the knob cover 110 forms a conductive path. This path allows the user's finger touching the knob device 100 to be connected to the touch panel 300 through the conductive path, which is equivalent to allowing the user to indirectly control the touch panel 300. In other words, when the user touches the knob cover 110 of the knob device 100, the touch panel 300 generates a sensing signal in response to a loop formed by the touch panel 300, the knob device 100 and the user. Furthermore, when the user rotates or presses the knob cover 110 of the knob device 100, the touch panel 300 generates different sensing signals in response to the movement and location of the knob device 100. As shown in FIG. 2, the knob device 100 comprises a rotation sensing element 130, a pressing touching element 150 and a plurality of sensing pads 170 fixedly arranged on the touch panel. When the knob cover 110 is rotated, the rotation sensing element 130 is rotated synchronously. The plurality of sensing pads 170 do not change locations while the rotation sensing element 130 is rotating. In the present embodiment, the rotation sensing element 130 comprises a base 132 and a pin 134 arranged on the base 132, and the base 132 is connected to the knob cover 110, but the present invention is not limited thereto. In some embodiments, the pin 134 is arranged on the knob cover 110, and the base 132 is omitted. The plurality of sensing pads 170 are separated from each other by gaps. The plurality of sensing pads 170 and gaps are distributed in a ring around a center of an orthographic projection of the knob cover 110, where the orthographic projection of the knob cover 110 may be on a two-dimensional (2D) plane parallel with the touch panel 300. In addition, the touch panel 300 has multiple touch panel cells 301 arranged in a matrix format. When the user touches the knob cover 110 and the pin 134 of the rotation sensing element 130 overlaps one of the plurality of sensing pads 170 (e.g., the rotation sensing element 130 may abut against or get close to one of the plurality of sensing pads 170), the touch panel cell(s) 301 under the one of the plurality of sensing pads 170 generate sensing signal(s) in response to a location of the rotation sensing element 130. For example, based on the sensing signal(s) output from the touch panel cell(s) 301, the touch panel 300 generates a rotation sensing signal in response to the user touching and rotating knob cover 110 of the knob device 100. In the present embodiment, the pin 134 is arranged above the plurality of sensing pads 170, but the present invention is not limited thereto. In some other embodiments, the pin 134 is arranged between the plurality of sensing pads 170 and the touch panel 300.

Figure 3:
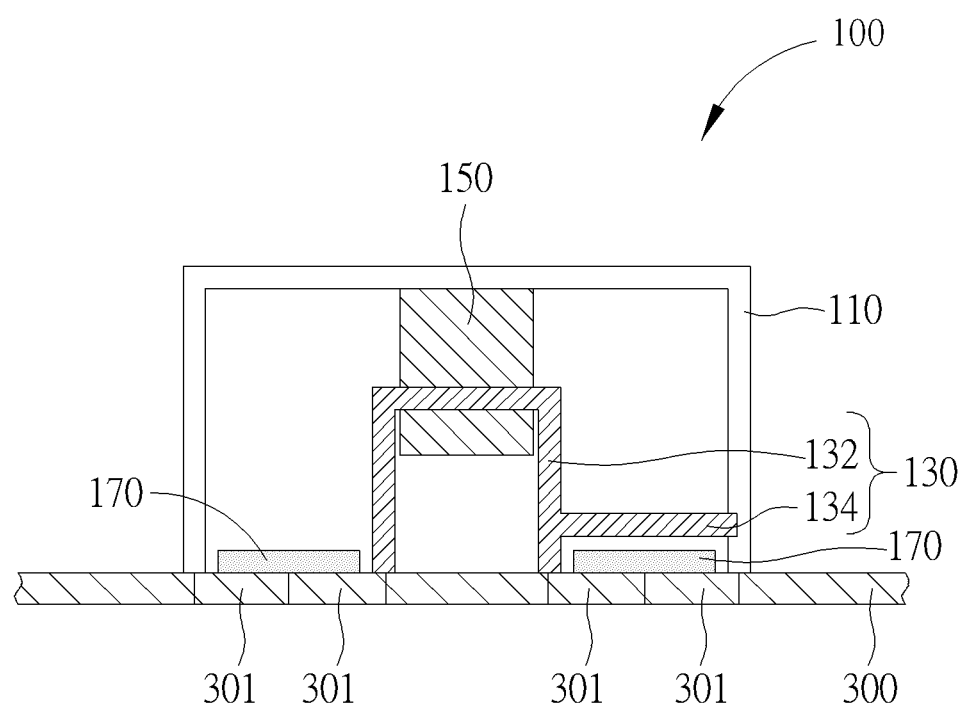
FIG. 3 is a cross-sectional view illustrating the knob device arranged on the touch panel according to an embodiment of the present invention.

Please refer to FIG. 3. FIG. 3 is a cross-sectional view illustrating the knob device 100 arranged on the touch panel 300 according to an embodiment of the present invention. As shown in FIG. 3, the plurality of sensing pads 170 are fixedly arranged above the touch panel 300, and abut against to the touch panel 300. The pressing touching element 150 may be connected to the knob cover 110 and/or the base 300. In the present embodiment, the pressing touching element 150 is shown connected to the knob cover 110 for better understanding of technical features of the present invention. When the user touches and presses the knob cover 110 of the knob device 100, the pressing touching element 150 abuts against or gets close to the touch panel 300, such that the touch panel cell(s) 301 under the pressing touching element 150 generate pressing sensing signal(s) in response to the pressing touching element 150. In other words, when a touch and press event of the knob device 100 occurs, the pressing touching element 150 abuts against or gets close to at least one of the plurality of sensing pads 170, and controls a pressing sensing signal of the touch panel 300. For example, based on the pressing sensing signal(s) output from the touch panel cell(s) 301, the touch panel 300 generates a pressing sensing signal in response to the user touching and pressing the knob cover 110 of the knob device 100.

Furthermore, when the user touches and rotates the knob cover 110 of the knob device 100, the touch panel cell(s) 301 under one sensing pad 170 which overlaps the pin 134 generate sensing signal(s) in response to a location of the rotation sensing element 130. It is noticed that, the knob cover 110 has a mechanism (e.g., a spring) that allows the knob cover 110 to be pressed down and rebound up when not being pressed. This mechanism is known to those skilled in the art, so the mechanism is not shown in figures, and further description is omitted here for simplicity.

Figure 4:
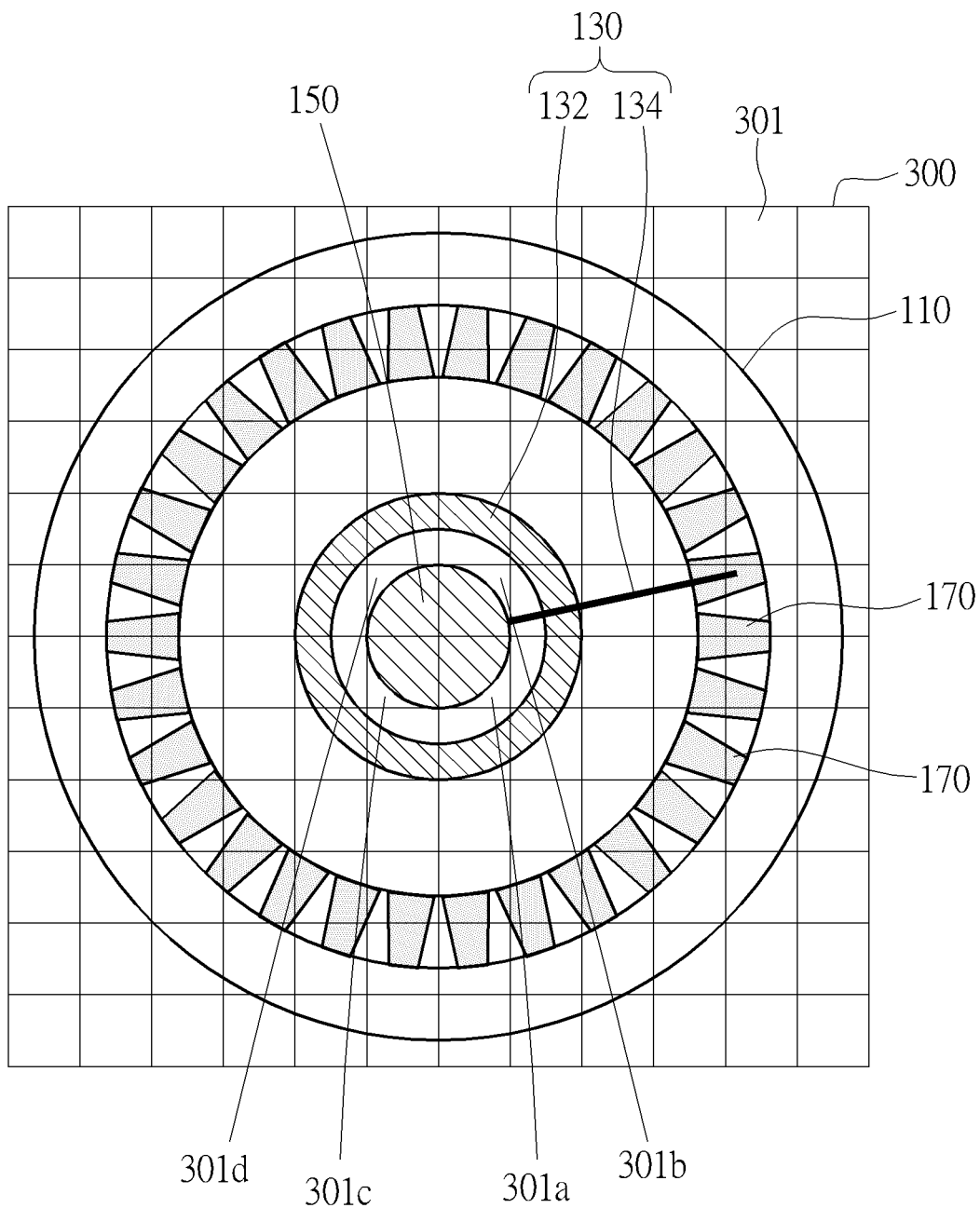
FIG. 4 is a top view illustrating the knob device arranged on the touch panel according to an embodiment of the present invention.

For example, please refer to FIG. 4. FIG. 4 is a top view illustrating the knob device 100 arranged on the touch panel 300 according to an embodiment of the present invention. Assume that when the user touches and presses the knob cover 110 of the knob device 100, four touch panel cells 301a, 301b, 301c and 301d are under the pressing touching element 150. As shown in FIG. 4, the four touch panel cells 301a, 301b, 301c and 301d generate four sensing signals due to the pressing touching element 150 directly above the touch panel cells 301a, 301b, 301c and 301d. When the knob cover 110 is rotated, the pressing touching element 150 is rotated synchronously. The touch panel 300 (particularly, a controller of the touch panel 300) can be pre-programmed for generating the pressing sensing signal when receiving four sensing signals generated from four touch panel cells (e.g., touch panel cells 301a, 301b, 301c and 301d in this embodiment). In addition, the pin 134 is connected to the knob cover 110, such that the pin 134 is synchronously rotated with the knob cover 110. The pin 134 is rotated to be moved from one sensing pad 170 to another sensing pad 170. When the user touches the knob device 100 and the pin 134 of the rotation sensing element 130 overlaps one of the plurality of sensing pads 170, the touch panel 300 generates a rotation sensing signal in response to a location of the rotation sensing element 130. In other words, when a touch and rotation event of the knob device 100 occurs and the pin 134 of the rotation sensing element 130 overlaps one of the plurality of sensing pads 170, a location of the rotation sensing element 130 controls a rotation sensing signal of the touch panel 300. As shown in the top view, all the sensing pads 170 may have the same shape and the same size, an orthographic projection of the pressing touching element 150 and the plurality of sensing pads 170 do not overlap, the pressing touching element 150 and the rotation sensing element 130 do not overlap. In the present embodiment, all the sensing pads 170 are located in the orthographic projection of the knob cover 110, but the present invention is not limited thereto. In some embodiment, said each sensing pad 170 comprises a first part and a second part connected with the first part, the first part is located in the orthographic projection of the knob cover 110, and the second part is located outside of the orthographic projection of the knob cover 110.

Figure 5:
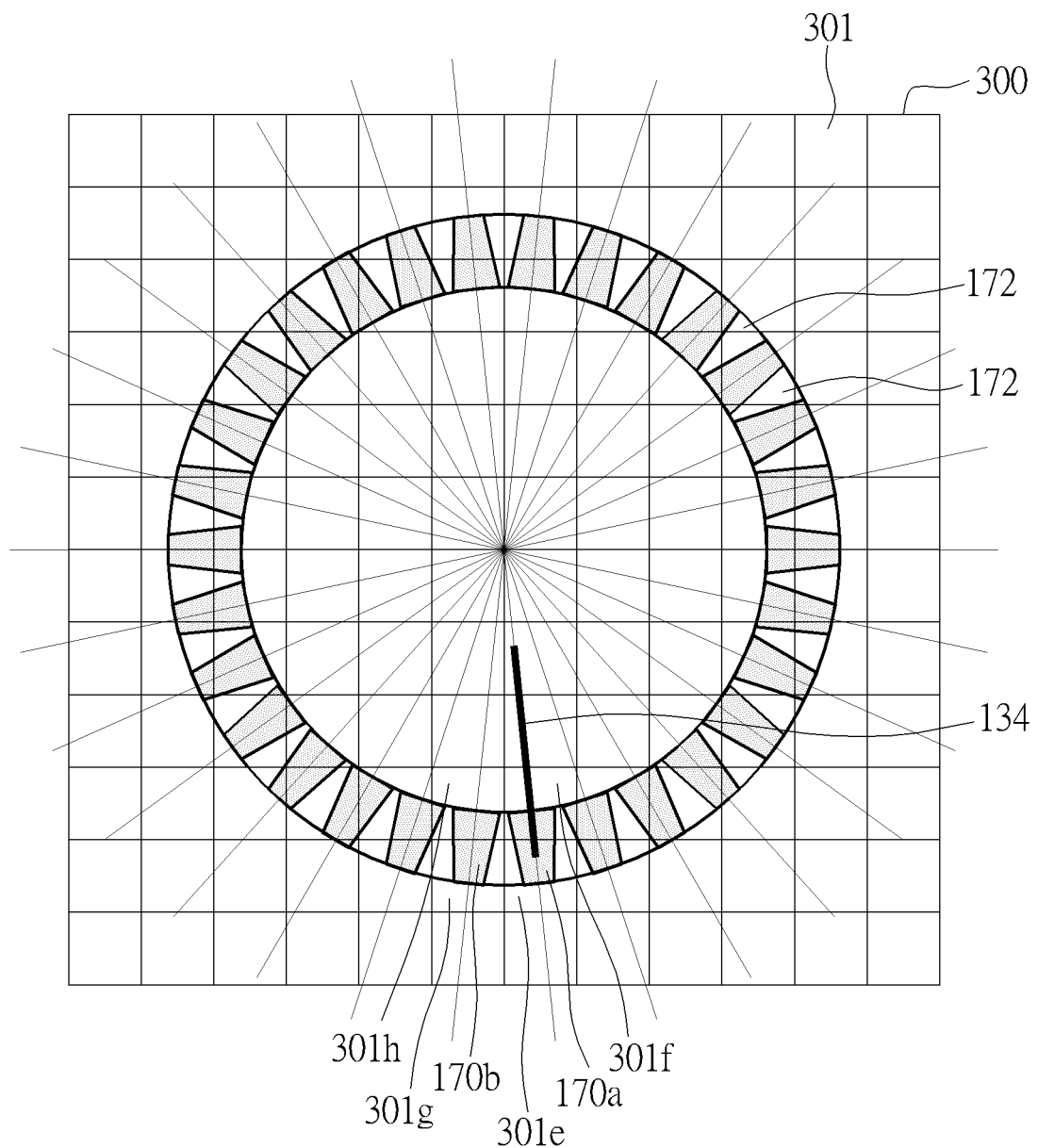
FIG. 5 is a top view illustrating a plurality of sensing pads distributed in a ring around a center of an orthographic projection of the knob cover according to an embodiment of the present invention.

For example, please refer to FIG. 5. FIG. 5 is a top view illustrating a plurality of sensing pads 170 distributed in a ring area around a center of an orthographic projection of the knob cover 110 according to an embodiment of the present invention. As shown in FIG. 5, the orthographic projection of the knob cover 110 is on the touch panel 300, a ring area is located around a center of the orthographic projection of the knob cover 110 (the knob cover 110 is not shown in FIG. 5 for simplicity), and a plurality of radiations are formed from the center of the orthographic projection of the knob cover 110. The plurality of radiations are separated by 12 degrees, and one sensing pad 170 is formed corresponding to one radiation in the ring area. In other words, the ring area around the center of the orthographic projection of the knob cover 110 is divided into a plurality of parts, and each sensing pad 170 is located in one of the plurality of parts of the ring area. As shown in FIG. 4 and FIG. 5, all the sensing pads 170 may have the same shape and the same size, an orthographic projection of the pressing touching element 150 and the plurality of sensing pads 170 do not overlap, the pressing touching element 150 and the rotation sensing element 130 do not overlap, and an area of each of the sensing pads 170 is formed outside of an orthographic projection of the rotation sensing element 130.

In practice, the degrees between the plurality of radiations are set depending on the resolution of the rotation angle of the knob device 100. In the present embodiment, the degrees between the plurality of radiations are all 12 degrees, but the present invention is not limited thereto. In some embodiments, the degrees between the plurality of radiations may not be all the same. It is noticed that one gap 172 is formed between every two neighboring sensing pads 170 among the plurality of sensing pads 170. In other words, the plurality of sensing pads 170 are separated from each other.

Similarly, when the user touches the knob cover 110 of the knob device 100, two touch panel cells 301e and 301f are under a sensing pad 170a which overlaps the pin 134, such that the two touch panel cell 301e and 301f generate two sensing signals which represents that the knob device 100 is touched. If the user rotates the knob cover 110 of the knob device 100 clockwise, the pin 134 is moved to a position above a sensing pad 170b, such that two touch panel cells 301g and 301h are under the sensing pad 170b which overlaps the pin 134 and generate two sensing signals. The touch panel 300 (particularly, a controller of the touch panel 300) can be pre-programmed for generating a rotation sensing signal which represents that the knob device 100 is rotated when firstly receiving two sensing signals generated from two touch panel cell (e.g., touch panel cells 301e and 301f in this embodiment) and then receiving two sensing signals generated from another touch panel cells (e.g., touch panel cells 301g and 301h in this embodiment). It is noticed that when the pin 134 is moved above one of the plurality of gaps 172, the touch panel cell(s) under the pin 134 does not generate any sensing signal, such that the location of the pin 134 and the rotation angel of the knob device 100 are not misjudged even at a position between two touch panel cells. Furthermore, the resolution of the rotation angle of the knob device 100 can be higher. In other words, when the touch and rotation event of the knob device occurs and the pin 134 of the rotation sensing element 130 does not overlap one of the plurality of sensing pads 170, the rotation sensing element 130 does not induce the rotation sensing signal of the touch panel 300.

In addition, the quantity and the shapes of sensing pads may have some variations to meet different requirements. Regarding specific touch panel cells under the sensing pads, the touch panel 300 (particularly, a controller of the touch panel 300) has to be pre-programmed for generating a rotation sensing signal corresponding to the specific touch panel cells.

According to the above arrangements, each sensing pad 170 is formed in the ring area according to one radiation from the center of an orthographic projection of the knob cover 110 to cover specific touch panel cells, and the plurality of gaps 172 are formed between the sensing pads 170 to separate the sensing pads. The touch panel 300 generates sensing signal(s) only when the user touches the knob device 100 and moves the pin 134 to a location overlapping one of the plurality of sensing pads 170. Since the touch panel cell(s) under the pin 134 at a location not overlapping any of the plurality of sensing pads 170 does not generate any sensing signal, the touch panel 300 does not misjudge the location of the pin 134, such that the resolution of the rotation angle of the knob device 100 is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A knob device, applicable to a touch panel, the knob device comprising:
    a knob cover;
    a plurality of sensing pads being greater than two, fixedly arranged on the touch panel, wherein a plurality of gaps are formed between the plurality of sensing pads such that a gap is formed between each two neighbouring sensing pads of the plurality of sensing pads, the plurality of sensing pads and the plurality of gaps are distributed in a ring area around a center of an orthographic projection of the knob cover, wherein each sensing pad of the plurality of sensing pads can induce both a rotation sensing signal and a pressing sensing signal according to proximity of the knob cover; and
    a rotation sensing element, connected to the knob cover, wherein when the knob cover is rotated, the rotation sensing element is rotated synchronously;
    wherein when a touch and rotation event of the knob device occurs and the rotation sensing element overlaps one of the plurality of sensing pads, a location of the rotation sensing element controls a rotation sensing signal of the touch panel.

2. The knob device of claim 1, wherein the rotation sensing element is arranged between the knob cover and the plurality of sensing pads, and the rotation sensing element is located above the ring area of the plurality of sensing pads.

3. The knob device of claim 1, wherein the ring area around the center of the orthographic projection of the knob cover is divided into a plurality of parts, and each sensing pad is located in one of the plurality of parts of the ring area.

4. The knob device of claim 1, wherein all the sensing pads have a same shape and a same size.

5. The knob device of claim 1, wherein when the touch and rotation event of the knob device occurs and the rotation sensing element does not overlap one of the plurality of sensing pads, the rotation sensing element does not induce the rotation sensing signal of the touch panel.

6. The knob device of claim 1, wherein said each sensing pad comprises a first part and a second part connected with the first part, the first part is located in the orthographic projection of the knob cover, and the second part is located outside of the orthographic projection of the knob cover.

7. The knob device of claim 1, wherein the rotation sensing element comprises a rotatable base disposed directly under the knob cover, and a pin which is fixed to and projects out from the rotatable base and is disposed directly above the plurality of sensing pads, and the knob device further comprises:
    a pressing touching element, arranged between the knob cover and the plurality of sensing pads and connected to the knob cover;
    wherein the pressing touching element is located above the ring of the plurality of sensing pads, and when a touch and press event of the knob device occurs, the pressing touching element is depressed and abuts against or gets close to at least one of the plurality of sensing pads, and controls a pressing sensing signal of the touch panel.

8. The knob device of claim 7, wherein an orthographic projection of the pressing touching element and the plurality of sensing pads do not overlap.

9. The knob device of claim 7, wherein the pressing touching element and the rotation sensing element do not overlap.

10. The knob device of claim 7, wherein when the knob cover is rotated, the pressing touching element is rotated synchronously.

11. The knob device of claim 7, wherein the touch panel comprises a matrix of cells, a first plurality of cells of the matrix of cells are pre-programmed for generating the pressing sensing signal, and a second plurality of cells different from the first plurality of cells are pre-programmed for generating the rotation sensing signal.

12. The knob device of claim 11, wherein the first plurality of cells are disposed under the orthographic projection of the pressing touching element, and the second plurality of cells are disposed under the orthographic projection of the pin of the rotation sensing element.

* * * * *